United States Patent
Zhang et al.

(10) Patent No.: US 9,594,256 B2
(45) Date of Patent: Mar. 14, 2017

(54) THERMOPLASTIC LAMINATE, DECORATIVE PART FOR EYEWEAR AND PROCESS OF PREPARATION THEREOF

(71) Applicant: OKIA OPTICAL CO., LTD., Hong Kong (CN)

(72) Inventors: Yan Zhang, Hong Kong (CN); Chi Ho Lam, Hong Kong (CN)

(73) Assignee: OKIA OPTICAL CO., LTD., Kowloon (HK)

( * ) Notice: Subject to any disclaimer, the term of this patent is extended or adjusted under 35 U.S.C. 154(b) by 12 days.

(21) Appl. No.: 14/421,152

(22) PCT Filed: Aug. 13, 2013

(86) PCT No.: PCT/CN2013/000952
§ 371 (c)(1),
(2) Date: Feb. 12, 2015

(87) PCT Pub. No.: WO2014/029192
PCT Pub. Date: Feb. 27, 2014

(65) Prior Publication Data
US 2015/0219921 A1    Aug. 6, 2015

(30) Foreign Application Priority Data
Aug. 24, 2012    (CN) .......................... 2012 1 0304577

(51) Int. Cl.
*B41M 5/50* (2006.01)
*G02C 11/02* (2006.01)
(Continued)

(52) U.S. Cl.
CPC .............. *G02C 5/008* (2013.01); *B32B 23/04* (2013.01); *B32B 27/08* (2013.01); *B32B 37/06* (2013.01);
(Continued)

(58) Field of Classification Search
CPC .. B41M 5/502; B41M 5/506; B41M 2205/02; G02C 11/02; B29C 65/04;
(Continued)

(56) References Cited

U.S. PATENT DOCUMENTS 2,802,418 A    8/1957   Carver
2,867,053 A    1/1959   Boor
(Continued)

FOREIGN PATENT DOCUMENTS

CN      2444789 Y      8/2001
CN      1405013       3/2003
(Continued)

OTHER PUBLICATIONS

Cellulose Acetate Plastics by Vivian Stannett, Temple Press Limited, 1950.
(Continued)

*Primary Examiner* — Bruce H Hess
(74) *Attorney, Agent, or Firm* — Kam W. Law; Squire Patton Boggs (US) LLP

(57) ABSTRACT

The present invention relates to a thermoplastic laminate for an eyewear, a decorative part comprising the thermoplastic laminate and a preparation process therefore. In particular, during the preparation of the laminate, a high frequency welding machine is used for bonding thermoplastic layers. The present invention uses a high frequency welding machine for the instant welding of the thermoplastic layers. Good bonding strength exists between different layers. Further, the patterns of the core layer are intact, and have high-definition images. The patterns are located in the core layer, not affected by external environmental factors, and not easily abraded. Further, multiple surfaces of the part for an eyewear have patterns, increasing the beautiful appearance (Continued)

of the part for an eyewear, and meeting the requirements of customers to the largest extent.

12 Claims, 6 Drawing Sheets

(51) Int. Cl.

| | |
|---|---|
| *B29C 65/04* | (2006.01) |
| *G02C 5/00* | (2006.01) |
| *B32B 37/06* | (2006.01) |
| *B44F 1/06* | (2006.01) |
| *B32B 23/04* | (2006.01) |
| *B32B 27/08* | (2006.01) |
| *B32B 37/12* | (2006.01) |
| *B32B 37/24* | (2006.01) |
| *B32B 38/00* | (2006.01) |
| *B44C 1/16* | (2006.01) |
| *B44C 1/20* | (2006.01) |
| *B44C 1/24* | (2006.01) |
| *B29C 63/04* | (2006.01) |
| *B29C 65/00* | (2006.01) |

(52) U.S. Cl.
CPC ............ *B32B 37/12* (2013.01); *B32B 37/24* (2013.01); *B32B 38/145* (2013.01); *B41M 5/506* (2013.01); *B44C 1/16* (2013.01); *B44C 1/20* (2013.01); *B44C 1/24* (2013.01); *B44F 1/06* (2013.01); *G02C 11/02* (2013.01); *B29C 63/04* (2013.01); *B29C 65/04* (2013.01); *B29C 66/1122* (2013.01); *B29C 66/305* (2013.01); *B29C 66/433* (2013.01); *B29C 66/45* (2013.01); *B29C 66/73365* (2013.01); *B29C 66/73921* (2013.01); *B29C 2795/002* (2013.01); *B32B 2307/75* (2013.01); *B32B 2310/12* (2013.01); *B32B 2451/00* (2013.01); *B32B 2551/00* (2013.01); *G02C 2200/14* (2013.01); *Y10T 156/10* (2015.01); *Y10T 156/1064* (2015.01); *Y10T 428/24851* (2015.01); *Y10T 428/31971* (2015.04)

(58) Field of Classification Search
CPC ............ B29C 66/45; B29C 66/73921; B29C 2795/002; B29C 2795/02; B32B 2310/12; B32B 2251/00
USPC .......................................... 503/227; 156/277
See application file for complete search history.

(56) References Cited

U.S. PATENT DOCUMENTS

| | | | |
|---|---|---|---|
| 3,592,725 | A | 7/1971 | Yoshimura |
| 3,753,825 | A | 8/1973 | Stock |
| 3,898,781 | A | 8/1975 | Facchini |
| 4,057,921 | A | 11/1977 | Ball |
| 4,665,598 | A | 5/1987 | Murai et al. |
| 4,690,523 | A | 9/1987 | Loiacono |
| 2,364,870 | A | 12/1994 | Otto |
| 5,923,395 | A | 7/1999 | Yamaguchi |
| 6,066,594 | A | 5/2000 | Gunn et al. |
| 6,322,862 | B1 | 11/2001 | Sakai |
| 6,808,804 | B2 | 10/2004 | Hotaka |
| 9,033,492 | B2 * | 5/2015 | Polegato Moretti .... A61F 9/028 351/123 |
| 2001/0030677 | A1 | 10/2001 | Inamoto |
| 2004/0114022 | A1 | 6/2004 | Uejima et al. |
| 2005/0040243 | A1 | 2/2005 | Bi et al. |
| 2005/0212843 | A1 | 9/2005 | Jones et al. |
| 2007/0254140 | A1 | 11/2007 | Zou |
| 2009/0174860 | A1 | 7/2009 | Lam et al. |
| 2010/0314034 | A1 | 12/2010 | Zou |

FOREIGN PATENT DOCUMENTS

| | | |
|---|---|---|
| CN | 1588172 | 3/2005 |
| CN | 2769931 | 4/2006 |
| DE | 1931406 A1 | 2/1970 |
| DE | 3935397 | 4/1991 |
| EP | 0457579 | 11/1991 |
| FR | 2483330 A1 | 12/1981 |
| FR | 2637532 A1 | 4/1990 |
| GB | 1055599 A | 1/1967 |
| GB | 1388680 A | 3/1975 |
| GB | 2169239 | 7/1986 |
| JP | 5660216 A | 5/1981 |
| JP | 5749520 A | 3/1982 |
| JP | 60-059319 | 4/1985 |
| JP | 4324816 A | 11/1992 |
| JP | 201140457 A | 5/2001 |
| JP | 3081177 U | 8/2001 |
| JP | 2003-021813 | 1/2003 |
| JP | 2004338246 A | 12/2004 |
| WO | 2007128196 A | 11/2007 |

OTHER PUBLICATIONS

International Search Report of PCT/CN2013/000952.
Partial supplementary European search report for the counterpart EP application, dated Mar. 31, 2016.

* cited by examiner

THERMOPLASTIC LAMINATE, DECORATIVE PART FOR EYEWEAR AND PROCESS OF PREPARATION THEREOF

CROSS-REFERENCED TO RELATED APPLICATIONS

This is a U.S. national stage application of the International Patent Application No. PCT/CN2013/000952, filed Aug. 13, 2013, which claims priority to Chinese Patent Application No. 201210304577.2, filed on Aug. 24, 2012, both of which are incorporated herein by reference in their entireties.

TECHNICAL FIELD

This invention relates to thermoplastic laminates, decorative parts and processes of preparation thereof, particularly the field of the laminates and decorative parts for eyewear.

BACKGROUND OF THE INVENTION

Currently, the thermoplastic laminate with pattern for eyewear is manufactured generally by silk screen printing. The silk screen printing needs to produce a film causing high manufacturing cost and long production cycle. Due to the low bonding strength of laminate and ink used in the silk screen printing, it requires using an adhesive or other solvents (such as ingredient agents) to strengthen the bonding strength of the laminates.

In manufacturing the thermoplastic laminate with pattern by using transferring technology, a Japanese patent published in Dec. 2, 2004 with application No. JP2003-138051 discloses a heat pressing transfer printing using sublimation ink. Since the ink penetrates or diffuses into the laminate causing blurred patterns and low bonding strength during heat pressing. Moreover, the pattern of patterned resin laminates made by this method can only be located in an internal position, otherwise the adhesion is poor.

BRIEF DESCRIPTION OF THE INVENTION

This field now needs thermoplastic laminates, decorative parts and their processes of preparation with high-definition and lifelike (vivid) design patterns. The thermoplastic laminates and decorative parts (such as eyewear parts) provided by the present invention are colorful, unfading, unaffected by external factors, and three-dimensional. In particular, it is applied in the field of laminates or decorative parts for eyewear.

In addition, the process of preparation of the thermoplastic laminates and decorative parts of the present invention is simple and production cycle is short. Furthermore, multiple sides of the decorative parts (such as eyewear parts) have design patterns, increasing the aesthetics of eyewear parts to satisfy the needs of this field to the largest extent.

One objective of the present invention is a method for preparing the thermoplastic laminate for eyewear and the thermoplastic laminate obtained according to the method, especially the thermoplastic laminate obtained according to the method for eyewear. The thermoplastic laminates are welded by using a high frequency welding machine so that the welding of multiple thermoplastic layers with a pattern and/or an article can happen instantly. Specifically, the surfaces of adjacent thermoplastic layers are welded so as to enhance the bonding strength and produce the high-definition pattern without deformation or blurring. The pattern without penetration or diffusion after transfer printing makes the design pattern clearer. Meanwhile, in the process of preparation of this invention, the article located in a core layer is in integrity and its position will not shift.

In order to achieve this objective, the present invention relates to technical solutions of the following aspects:

In a first aspect, a method for preparing a thermoplastic laminate for an eyewear, wherein the thermoplastic laminate comprises an upper layer, a lower layer, and one or more core layers and optional one or more inner layers located between the upper layer and lower layer, and wherein the method comprises the steps of:

1) providing the thermoplastic upper layer and lower layer;
2) providing one or more core layers, which are selected from a pattern, an article and combinations thereof, located between the upper layer and lower layer;
3) optionally providing one or more thermoplastic inner layers between the upper layer and an adjacent core layer, the lower layer and an adjacent core layer, and/or two adjacent core layers;
4) bonding one or more core layers, the upper layer, the lower layer and the optional inner layers together by using a high frequency welding machine; and
5) obtaining the laminate.

Optionally, the thermoplastic laminate has one or more thermoplastic inner layers located between the upper layer and an adjacent core layer, the lower layer and the adjacent core layer, and/or the two adjacent core layers. And the inner layer acts as a barrier to prevent penetration of color, or generates stereo effect by separating different core layers spatially.

In a second aspect, according to the method of the first aspect, wherein at least one of the core layers is a pattern, and wherein the pattern is fixed by a transfer printing process on a surface of the upper layer, the lower layer and/or an optional inner layer where the surface is bonded with an adjacent layer.

In a third aspect, according to the method of the second aspect, wherein the transfer printing process comprises the steps of:

A) printing the pattern onto a transfer medium, wherein the transfer medium is preferred to be a paper;
B) optionally, drying the transfer medium printed with pattern to remove solvents and/or water, wherein the drying temperature is from about 40° C. to about 70° C., or in particular from about 50° C. to about 65° C.; and
C) transferring the pattern from the transfer medium onto a surface of a targeted layer, wherein the preferred transferring temperature is from about 100° C. to about 250° C.

Optionally, the printing in step A) is digital printing.

In a fourth aspect, according to the method of the third aspect, wherein a sublimation ink containing a sublimation dye is used in the printing step A).

In a fifth aspect, according to the method of the third or fourth aspect, wherein the relative humidity of air in step A) is maintained from about 45% to about 80%.

In a sixth aspect, according to the method of the third to fifth aspects, wherein the transfer printing time in step C) is from about 30 seconds to about 200 seconds.

In a seventh aspect, according to the method of the second to sixth aspects, wherein the thermoplastic layer with the pattern fixed by the transfer printing process is dried by drying treatment before step 4), and the ink does not penetrate into the thermoplastic layers so as to make a clear pattern.

In an eighth aspect, according to the method of any one of the previous aspects, wherein at least one of the one or more core layers is an article, wherein the article is fixed on a surface of the upper layer, the lower layer, and/or optional inner layer, where the surface is bonded with an adjacent layer, and optionally at least a position on the surface where the article is located has a cavity having the same size and shape of the article.

In a ninth aspect, according to the method of the eighth aspect, wherein at least one of the one or more core layers is a pattern and at least one of the one or more core layers is the article, and wherein the pattern and article are in the same surface or different surfaces of a layer, or on an adjacent surface or non-adjacent surfaces of different layers.

In a tenth aspect, according to the method of any one of the previous aspects, wherein the welding time of the high frequency welding machine in step 4) is greater than about 15 seconds, preferably greater than about 20 seconds and less than about 5 minutes, preferably less than about 1 minute, or in particular from about 30 seconds to about 50 seconds.

In an eleventh aspect, according to the method of any one of the previous aspects, wherein the electric current of the high frequency welding machine in step 4) is greater than about 0.2 A, preferably greater than about 0.5 A but less than about 5 A, preferably less than about 2 A, or in particular from about 0.6 A to about 1.3 A.

In a twelfth aspect, according to the method of any one of the previous aspects, wherein the cooling time of the high frequency welding machine used in step 4) after bonding is greater than about 0.5 minutes, preferably greater than about 1 minute but less than about 5 minutes, preferably less than about 3 minutes, or in particular about 2 minutes.

In a thirteenth aspect, according to the method of any one of the previous aspects, wherein the thermoplastic layer prior to use is subjected to the drying and/or annealing treatment. According to different materials, the time and temperature of the drying and/or annealing treatment are different, generally from 50° C. to 150° C. and from 4 hours to 48 hours.

Another objectives of this invention are to provide a thermoplastic laminate prepared by the above methods and their use, the processing method of preparing decorative parts (such as eyewear parts) having decorative patterns and/or articles in multiple sides with the thermoplastic laminate, and decorative parts having decorative patterns and/or articles in multiple sides obtained from the methods and their use.

In a fourteenth aspect, a method of preparing a decorative part for an eyewear, wherein at least two adjacent sides of the decorative part comprise a pattern and/or an article, and wherein the method comprises the steps of:
  1) providing a thermoplastic laminate prepared by the method disclosed herein, wherein the laminate can be divided into a top layer and a bottom layer, and wherein the bottom layer comprises a pattern and/or an article;
  2) removing a portion from the top layer of the laminate to form an exposed part at the bottom layer of the laminate corresponding to the removed portion, and to form a surface to be overlaid at a side of the top layer of the laminate;
  3) optionally, coating with an adhesive the newly formed surface to be overlaid and optional an adjacent surface to be overlaid; and
  4) overlaying and heat pressing the exposed part of the bottom layer of the laminate onto the newly formed surface to be overlaid and optional adjacent surface to be overlaid.

In a fifteenth aspect, a method of preparing a decorative part for an eyewear, wherein the method comprises the steps of:
  1) providing a thermoplastic laminate prepared by the method disclosed herein;
  2) heat pressing the thermoplastic laminate to form an outer shell of the decorative part with decorative effect;
  3) placing the outer shell from step 2) into a mold, and injecting a material into the mold to form the body of the decorative part by injection molding; and
  4) taking the decorative part overlaid with the thermoplastic laminate outer shell out of the mold after the injection molding.

In a sixteenth aspect, a method of preparing a decorative part for an eyewear, wherein at least two sides of the decorative part comprise a pattern and/or an article, and wherein the method comprises the steps of:
  1) providing a substrate with at least two surfaces to be overlaid;
  2) providing a thermoplastic laminate prepared by the method disclosed herein; and
  3) bonding the thermoplastic laminate together with all the surfaces to be overlaid by heat pressing and/or an adhesive.

In a seventeenth aspect, according to the method of any one of the fourteenth to sixteenth aspects, wherein the decorative part is a part of an eyewear, such as a front frame of the eyewear, a temple of the eyewear or another accessory of the eyewear such as an endtip of the eyewear.

In an eighteenth aspect, according to the method of any one of the fifteenth to seventeenth aspects, wherein the thickness of the thermoplastic laminate is less than about 5 mm, or in particular less than about 3 mm.

In a nineteenth aspect, according to the method of the fourteenth or sixteenth aspect, wherein the heat pressing includes placing the parts to be bonded into the mold and heat pressing the parts.

In a twentieth aspect, a thermoplastic laminate prepared by the method of any one of first to thirteenth aspects.

In a twenty-first aspect, use of the thermoplastic laminate of twentieth aspect in preparing a part of an eyewear, such as a front frame of the eyewear, a temple of the eyewear or another accessory of the eyewear such as an endtip of the eyewear.

In a twenty-second aspect, a decorative part prepared by the method of any one of fourteenth to nineteenth aspects.

In a twenty-third aspect, use of the decorative part of twenty-second aspect in preparing a part of an eyewear, such as a front frame of the eyewear, a temple of the eyewear or another accessory of the eyewear such as an endtip of the eyewear.

BRIEF DESCRIPTION OF THE DRAWINGS

Preferred embodiments of the present invention will be further illustrated with reference to the figures below. The purpose is only illustrative and not restrictive.

DETAILED DESCRIPTION OF THE INVENTION

Figure 1:
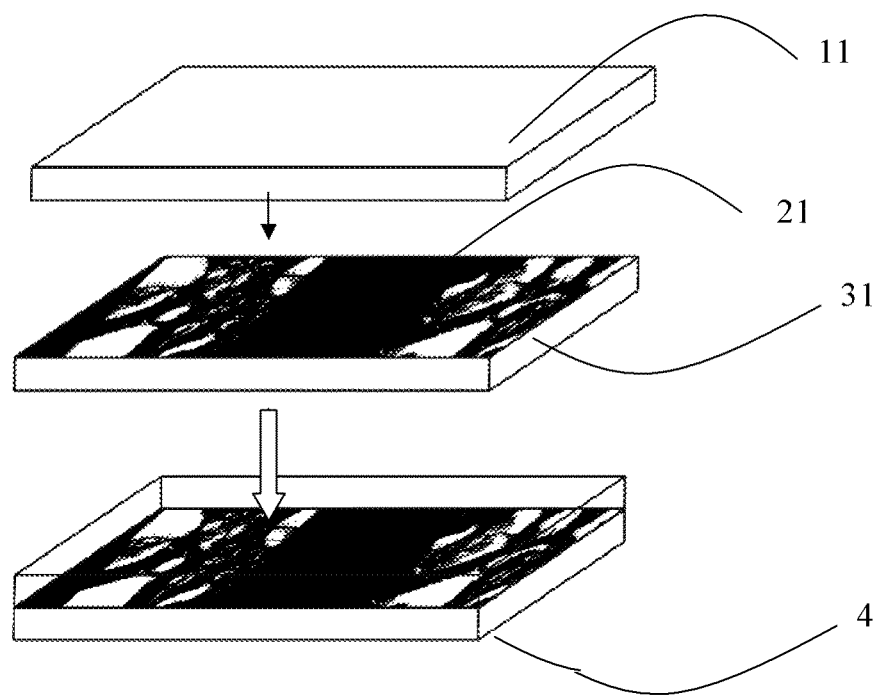
FIG. 1 depicts an embodiment of the method of preparing a thermoplastic laminate with a pattern of the present invention.

The preferred embodiments and examples described below will be used to specifically describe the present invention and are not intended to in any way be construed as limiting the present invention.

The term "thermoplastic" or "thermoplastic material" as used herein refers to any thermoplastic material suitable for the field of eyewear and used to achieve the technical solution of the present invention. For example, the thermoplastic material is selected from cellulose acetate, cellulose propionate, nylon (such as nylon-12) and polycarbonate etc.

The term "core layer" as used herein refers to a part for decorative effect, located between the upper layer and the lower layer in the thermoplastic laminate, where the part can be a pattern, an article, or a combination of both. The core layer may exist independently as a layer (such as an article) or can also form a portion of a layer (such as a pattern). The core layer is not necessary to be thermoplastic and is not necessary to have the same area as the other layer. For example, the core layer may only form or attach to a part of the surface of the other layer. The core layer is also not necessary to have a specific thickness and volume, for example, the pattern may be formed by the ink on the surface of the other layer, or even the pattern may be formed by the ink penetrating into the inner surface of the other layer.

The term "pattern" as used herein refers to the decorative design or figure, formed on a substrate (such as a thermoplastic layer), which can be formed by the conventional methods in the art, for example, printing, coating and the like. Furthermore, the "pattern" can be a planar pattern or a three-dimensional pattern, such as patterns formed by convex and/or concave. For the convex pattern, it is necessary to form a corresponding cavity on the surface of the adjacent layer. Preferably, the pattern is formed by printing, more preferably formed by transfer printing process.

The term "article" as used herein refers to an object which can exist independently and has a substantially fixed shape, for example, various natural or artificial decorative pieces, such as metal foil. The articles can be solid, or hollow, for example, filled with liquid or solid particles in an internal cavity.

The term "inner layer" as used herein refers to the thermoplastic layer, located between the upper layer and the lower layer, which is welded as a whole with the adjacent layers during high frequency welding process. The inner layer exerts an anchor effect to core layers located there between. The inner layer may also act as a barrier. After the laminate is bonded, the inner layer prevents penetration of color between different colored layers (such as penetration of an ink or a toner) and thus a phenomenon of infiltration of colors. The inner layer achieves an effect of clear appearance required by the design. Furthermore, the inner layer can also be used to separate different core layers to produce a stereo effect in a certain space between the pattern and/or article. Optionally, the inner layer can also have other functions, such as additional decorative function. The same or different thermoplastic materials can be used for the inner layer and the upper layer and/or the lower layer.

The term "high frequency welding machine" and "high frequency machine" can be interchangeably used herein, which refers to any high frequency induction heating equipment for welding the thermoplastic layers together.

Preparation of Core Layer

The core layer used in the present invention can be prepared by using methods known to a person skilled in the art, or be obtained, for example, by the following methods.

1. When the Core Layer is a Pattern, the Pattern can be Formed on a Thermoplastic Layer by the Following Method.

The design pattern is designed by using a computer. The desired pattern is printed onto a transfer medium, wherein the transfer medium is preferred to be a paper. The printer used is an ink jet printer equipped with a sublimation ink, wherein the ink used in the printer is, for example, the sublimation ink containing a sublimable dye. For strengthening the bonding strength of the subsequent laminates, the ink is preferred to be a water-based ink.

Wherein, the air humility is maintained from 45% to 80%, or even from 50% to 70%, when the desired pattern is printed onto the transfer medium.

Optionally and preferably, the transfer medium printed with pattern is dried by drying treatment to remove excess solvents and/or water. This prevents the ink from diffusing and/or penetrating on the transfer medium. This ensures the clarity of the pattern on the transfer medium. The clarity of the pattern is improved accordingly after transfer printing. The drying temperature is, for example, from 40° C. to 70° C.

The design pattern printed on the transfer medium is heat transferred to the thermoplastic layer. The preferred transfer temperature is from 100° C. to 250° C. The transfer printing time is from 30 seconds to 200 seconds. In order to achieve a better transfer effect, preferably, the pattern is transferred onto a thin layer to form a patterned layer. The transfer effect of such mass production is stable and will not easily cause color variation. More preferably, the thin layer transfer printed with the pattern is dried by drying treatment so that the pattern and ink are fixed on the surface of the layer. This prevents the ink from diffusing and penetrating on the surface and/or deep into the layer and enables the pattern having a better clarity. Preferably, the pattern is transferred from the dried transfer medium to the thermoplastic layer, and the layer is then dried by drying treatment after transfer printing.

2. When the Core Layer is an Article, the Article can be Fixed on a Thermoplastic Layer Or Between Adjacent Thermoplastic Layers by the Following Method.

If the article is flaky, adhesive can be used to fix the article at a designed position. When thermoplastic laminates are welded, the article does not move. This meets the requirements of the designed shape and position.

If the article is thick or has three-dimensional effect, a cavity with the same or similar shape as the article is made in the specific position of a layer or two adjacent layers according to design. The article is placed in the corresponding position of the cavity. When the thermoplastic laminates are welded, the shape of the article remains intact, without shifting, damage or deformation. This meets the requirements of the designed shape and position. In addition, it is easy to control the quality of products, repetitive production so that the quality of the products can reach consistency even in a large-scale production.

3. When Both a Pattern and an Article Coexist in the Core Layer.

The pattern is formed and the article is fixed by conventional methods or methods 1 and 2 described above. Wherein, the pattern and article are in the same surface or different surfaces of a layer, or on an adjacent surface or non-adjacent surfaces of different layers. The placement of the article combining with the pattern can be fixed (adhesive/cavity) in a specific position according to a design. The design effect of combining the pattern with the article is achieved in order to create unique alignment effect of the pattern and article.

Drying and/or Annealing Treatment

The drying and/or annealing treatment of the present invention can be implemented, for example, by the following embodiment.

Different layers (the upper layer, the inner layers, the lower layer) constituting the thermoplastic laminate can be placed into an oven for drying and/or annealing treatment which remove unnecessary components, such as water, and ensure the dimensional stability of the product. The specific processing condition can be adjusted according to the requirements of materials and products, wherein the drying temperature is preferred to be from 50° C. to 150° C., and the drying time is preferred to be from 5 hours to 48 hours.

High Frequency Welding

The high frequency welding of thermoplastic laminates of the present invention can be implemented, for example, by the following embodiment.

A thermoplastic layer formed with a pattern and/or fixed with an article as obtained above is bonded together with another thermoplastic layer. The bonding is carried out by using a high frequency welding machine. Preferably, in order to make a product having a visual effect of a pattern and/or article, a transparent or translucent thermoplastic layer will be chosen for the upper layer and/or the lower layer and the optional inner layers according to a design.

A plurality of the thermoplastic layers is stacked in the order of the upper layer, optional inner layer, and lower layer as required by a design, wherein the pattern is formed or the article is fixed on the surface of at least one layer to be bonded with an adjacent layer. Welding is carried out by using the high frequency welding machine. Electric current, welding time and cooling time are controlled according to the actual needs. For example, the welding time of the high frequency welding machine is usually greater than 15 seconds, preferably greater than 20 seconds, but less than 5 minutes, preferably less than 1 minute, or even from 30 seconds to 50 seconds. The electric current is greater than 0.2 A, preferably greater than 0.5 A, but less than 5 A, preferably less than 2 A, or even from 0.6 A to 1.3 A. The electric current and welding time are adjusted according to materials, thickness, number of layers and materials of core layer (pattern, article and the like) in order to obtain desired bonding strength and keep the appearance of the core layer in good shape (clear pattern, good article shape and well positioned). Cooling is needed in order to keep the shape of the laminates. The cooling time is generally greater than 0.5 minutes, preferably greater than 1 minute, but less than 5 minutes, preferably less than 3 minutes, or even about 2 minutes.

The pattern is printed by transfer printing process using a sublimation ink through improvement and control of the above different processes. The pattern is transfer printed to the thermoplastic layer. Drying process is also used for products from each step of the transfer printing process. Then the high frequency welding machine is used for instant welding. This avoids penetration and/or diffusion of ink. The pattern of the thermoplastic laminate derived from thermoplastic layer is clear and colorful. The edge of the laminate can also have the pattern. Furthermore, the bonding strength is very good.

Further description is stated below with reference to figures and preferred embodiments for the method of preparing a thermoplastic laminate of the present invention and the method of preparing a decorative part (such as eyewear part) with decorative patterns and/or articles on multiple surfaces using the thermoplastic laminate of the present invention.

1. Preparing a Thermoplastic Laminate with a Pattern

FIG. 1 shows a thermoplastic layer 31 with a pattern 21 obtained by transfer printing method. A surface of the thermoplastic layer 31 with the pattern 21 and an adjacent thermoplastic layer 11 are welded instantly by using a high frequency welding machine. A thermoplastic laminate 4 with the pattern is obtained.

2. Preparing a Thermoplastic Laminate with an Article

Figure 2:
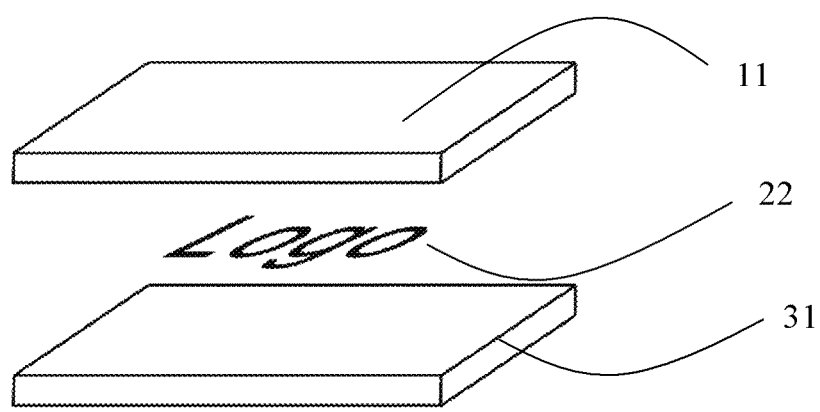
FIG. 2 depicts an embodiment of the method of preparing a thermoplastic laminate with an article of the present invention.

FIG. 2 shows a metal foil 22 with a beautiful pattern LOGO fixed on a thermoplastic layer 31. A thermoplastic layer 11 and a surface of the thermoplastic layer 31 fixed with an article are welded instantly by using a high frequency welding machine. The thermoplastic laminate with the article is obtained.

3. Preparing a Thermoplastic Laminate with a Pattern and an Article

Figure 3:
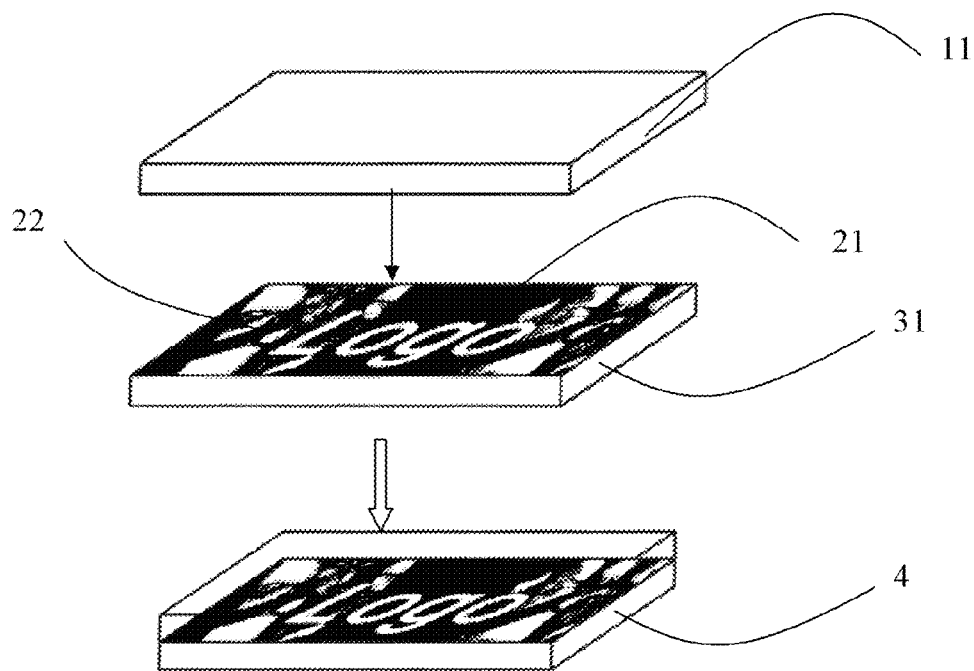
FIG. 3 depicts an embodiment of the method of preparing a thermoplastic laminate with a pattern and an article on the same surface of the same layer of the present invention.
Figure 4:
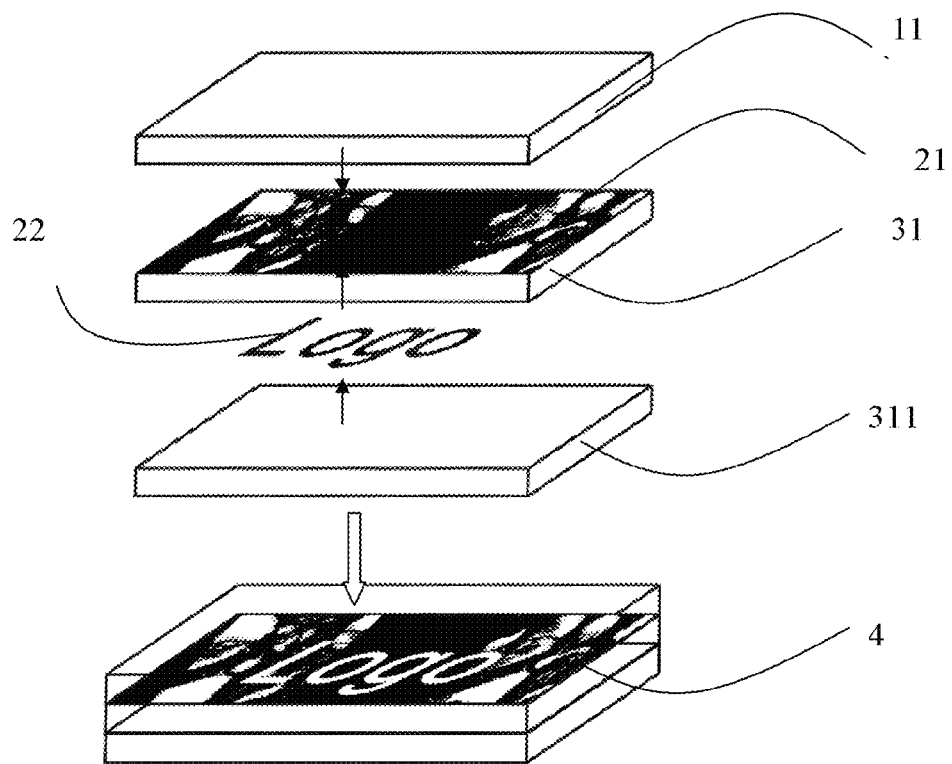
FIG. 4 depicts an embodiment of the method of preparing a thermoplastic laminate with patterns and articles on the opposite surfaces of the same layer of the present invention.

FIG. 3 or 4 shows a thermoplastic layer 31 with a pattern 21 obtained by transfer printing method. A metal foil 22 with a beautiful pattern LOGO is fixed on the same surface (FIG. 3) of the pattern 21, or different surface (FIG. 4) of the pattern 21. Preferably, the metal foil relative to the pattern is fixed at a specific position according to the requirements of a design. A thermoplastic layer 11, the thermoplastic layer 31, and a thermoplastic layer 311 are welded instantly by using a high frequency welding machine. The thermoplastic laminate with the pattern and the article is obtained.

Figure 5:
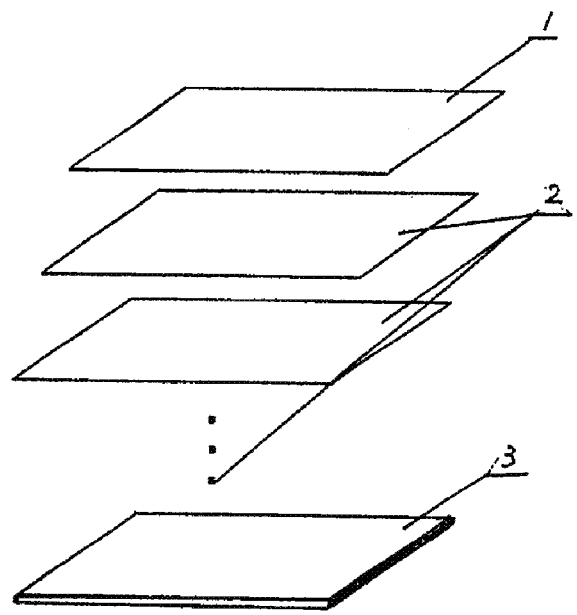
FIG. 5 depicts an embodiment of a thermoplastic laminate with a pattern and/or an article of the present invention having a plurality of core layers.

FIG. 5 shows a multilayer structure of a thermoplastic laminate with a plurality of core layers (illustrated as thin layers) having patterns and/or a plurality of core layers 2 (illustrated as thin layers) having articles. A plurality of core layers 2, an upper layer 1, a lower layer 3 and optional inner layer (not shown) are welded by using a high frequency welding machine. The thermoplastic laminate is obtained.

Figure 6:
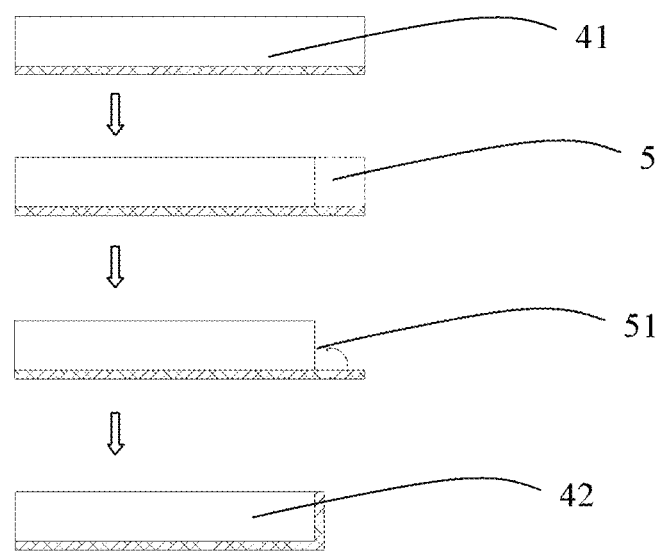
FIG. 6 depicts a first embodiment of the method of preparing a decorative part with patterns and/or articles on two surfaces of the present invention.

4. The First Embodiment of the Method of Preparing a Decorative Part with Patterns and/or Articles on Multiple Surfaces FIG. 6 depicts a first embodiment of the method of preparing a decorative part with patterns and/or articles on two surfaces of the present invention. Wherein, a thermoplastic laminate with patterns and/or articles of the present invention is provided. The laminate constitutes a decorative part 41. The decorative part can be divided into a top layer and a bottom layer, wherein the bottom layer comprises patterns and/or articles (the underlined layer as shown in FIG. 6). After removing a portion from the top layer of the thermoplastic material 5, the exposed part of the bottom layer 51 is overlaid and heat pressed onto the top layer. A decorative part 42 with patterns and/or articles on two surfaces is obtained.

Figure 7:
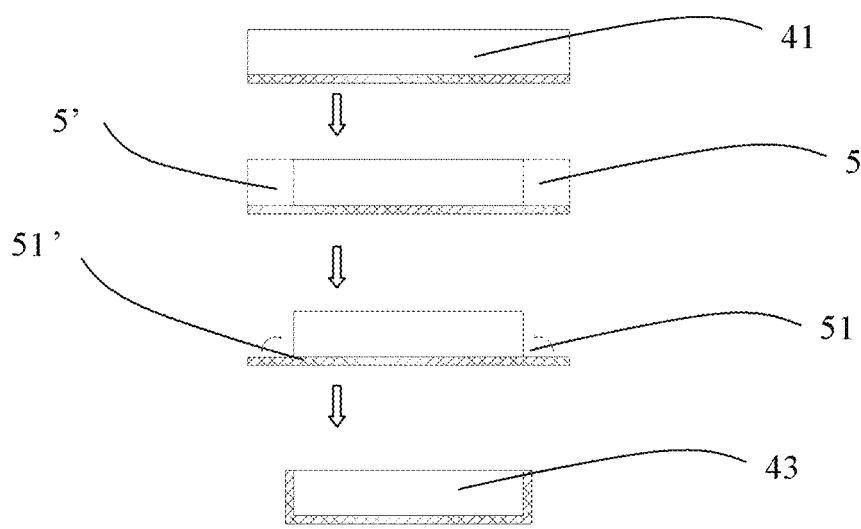
FIG. 7 depicts a first embodiment of the method of preparing a decorative part with patterns and/or articles on three surfaces of the present invention.

FIG. 7 depicts a first embodiment of the method of preparing a decorative part with patterns and/or articles on three surfaces of the present invention. Wherein, a decorative part 41 is made from a thermoplastic laminate with patterns and/or articles of the present invention. After removing a portion from the top layer of the thermoplastic material 5 and 5', the exposed part of the bottom layer 51 is overlaid and heat pressed onto the top layer. A decorative part 43 with patterns and/or articles on three surfaces is obtained.

Figure 8:
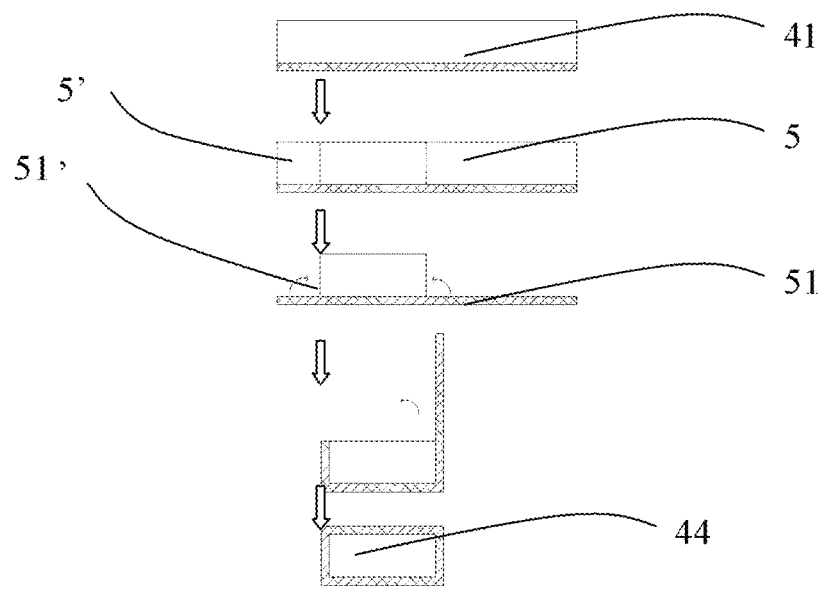
FIG. 8 depicts a first embodiment of the method of preparing a decorative part with patterns and/or articles on four surfaces of the present invention.

FIG. 8 depicts a first embodiment of the method of preparing a decorative part with patterns and/or articles on four surfaces of the present invention. Wherein, a decorative part 41 is made from a thermoplastic laminate with patterns and/or articles of the present invention. After removing a portion from the top layer of the thermoplastic material 5 and 5', the exposed part of the bottom layer 51 is overlaid and heat pressed onto the top layer. A decorative part 44 with patterns and/or articles on four surfaces is obtained.

Figure 9:
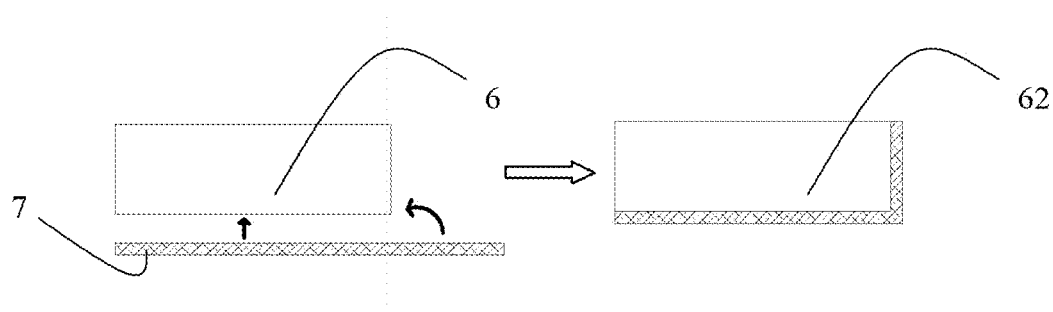
FIG. 9 depicts a second embodiment of the method of preparing a decorative part with patterns and/or articles on two surfaces of the present invention.

5. The Second Embodiment of the Method of Preparing a Decorative Part with Patterns and/or Articles on Multiple Surfaces FIG. 9 depicts a second embodiment of the method of preparing a decorative part with patterns and/or articles on two surfaces of the present invention. Wherein, a thermoplastic laminate 7 with a pattern and/or an article of the present invention is heat pressed to a substrate of decorative part 6 to be overlaid. A decorative part 62 with patterns and/or articles on two surfaces is obtained.

Figure 10:
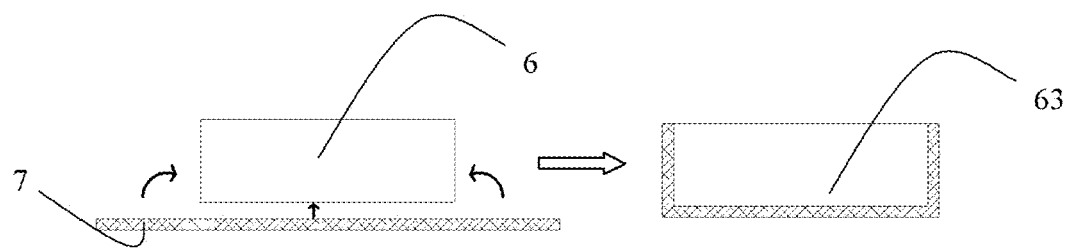
FIG. 10 depicts a second embodiment of the method of preparing a decorative part with patterns and/or articles on three surfaces of the present invention.

FIG. 10 depicts a second embodiment of the method of preparing a decorative part with patterns and/or articles on three surfaces of the present invention. Wherein, a thermoplastic laminate 7 with a pattern and/or an article of the present invention is heat pressed to a substrate of decorative part 6 to be overlaid. A decorative part 63 with patterns and/or articles on three surfaces is obtained.

Figure 11:
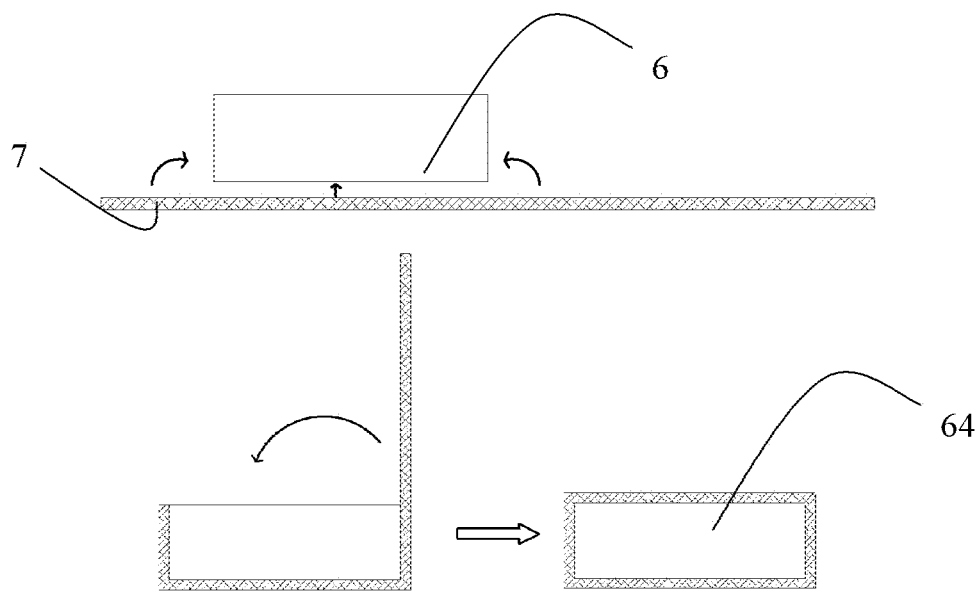
FIG. 11 depicts a second embodiment of the method of preparing a decorative part with patterns and/or articles on four surfaces of the present invention.

FIG. 11 depicts a second embodiment of the method of preparing a decorative part with patterns and/or articles on four surfaces of the present invention. Wherein, a thermoplastic laminate 7 with a pattern and/or an article of the present invention is heat pressed to a substrate of decorative part 6 to be overlaid. A decorative part 64 with patterns and/or articles on fours surfaces is obtained.

Figure 12:
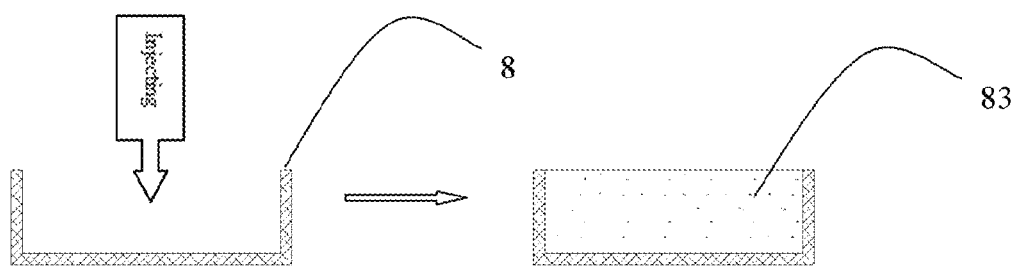
FIG. 12 depicts a third embodiment of the method of preparing a decorative part with patterns and/or articles on three surfaces of the present invention.

6. The Third Embodiment of the Method of Preparing a Decorative Part with Patterns and/or Articles on Multiple Surfaces FIG. 12 depicts a third embodiment of the method of preparing a decorative part with patterns and/or articles on three surfaces of the present invention. Wherein, a thermoplastic laminate with patterns and/or articles is heat pressed to form an outer shell 8.

The outer shell 8 is placed into a mold (not shown) before injecting a required material for forming the body of the decorative part. A decorative part 83 with patterns and/or articles on three surfaces is obtained.

Figure 13:
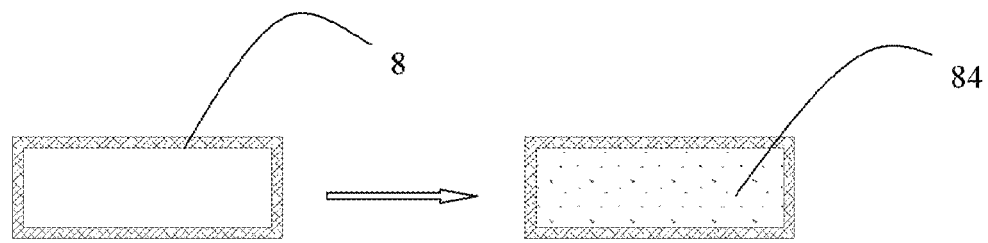
FIG. 13 depicts a third embodiment of the method of preparing a decorative part with patterns and/or articles on four surfaces of the present invention.

FIG. 13 depicts a third embodiment of the method of preparing a decorative part with patterns and/or articles on four surfaces of the present invention. Wherein, a thermoplastic laminate with patterns and/or articles is heat pressed to form an outer shell 8. The outer shell 8 is placed into a mold (not shown) before injecting a required material for forming the body of the decorative part. A decorative part 84 with patterns and/or articles on four surfaces is obtained.

EXAMPLES

The examples described below will be used to specifically describe the present invention. These examples are to be considered only illustratively and not restrictively.

Example 1

Preparing a Thermoplastic Laminate with a Pattern

A layer of cellulose acetate (CA) with a thickness of 0.5 mm was placed into an oven for drying and/or annealing treatment, wherein the drying temperature was 80° C., and the drying time was 4 hours. A design pattern was designed with a computer and the design pattern was then printed onto a transfer paper. The printer used was an ink jet printer equipped with a sublimation ink. The transfer paper printed with the design pattern was dried by drying treatment. The design pattern was then printed by heat transfer printing to the layer of cellulose acetate (CA) treated by the drying and/or annealing treatment. The layer of cellulose acetate (CA) printed with the pattern by transfer printing was dried by drying treatment. This prevented the ink from diffusing and penetrating on the surface and deep into the layer and enables the pattern having a better clarity. Another piece of transparent cellulose acetate (CA) with a thickness of 0.5 mm was instantly welded with a patterned layer of cellulose acetate (CA) by a high frequency welding machine, wherein the welding time was 10 seconds, and the current was 1.0 A. The thermoplastic laminate with the pattern was obtained. Furthermore, the thermoplastic layer and the patterned layer printed by transfer printing were stacked according to the desired thickness of the thermoplastic laminate. The layers were then instantly welded by using the high frequency welding machine.

Table 1 is a comparison of the effect between the thermoplastic laminate prepared by the above methods and the thermoplastic laminates prepared by prior art.

TABLE 1

The comparison between the laminates of the present invention and the prior art laminates

| Technology for forming pattern | Bonding mode of thermoplastic layer | Effect of pattern | Bonding strength |
| --- | --- | --- | --- |
| Silk screen printing | Heat pressing | Blurred pattern, single color | general |

TABLE 1-continued

The comparison between the laminates of the present invention and the prior art laminates

| Technology for forming pattern | Bonding mode of thermoplastic layer | Effect of pattern | Bonding strength |
|---|---|---|---|
| Sublimation ink transfer printing | High frequency welding machine (the present invention) | Relatively clear pattern, single color | good |
| | Heat pressing | Blurred pattern, rich colors; pattern can only be located in an internal position of a laminate. | bad |
| | High frequency welding machine (the present invention) | Clear pattern, rich colors; edge of a laminate can also have a pattern. | Very good |

Example 2

Preparing a Thermoplastic Laminate with a Pattern

2A. Preparing the Laminate, Wherein the Drying Step was Included

A layer of cellulose acetate (CA) was placed into an oven for drying and/or annealing treatment, wherein the drying temperature was 55° C., and the drying time was 8 hours. A design pattern was designed with a computer and the design pattern was then printed onto a transfer paper. The printer used was an inkjet printer equipped with a sublimation ink. The transfer paper printed with the design pattern was dried by drying treatment. The design pattern was then printed by heat transfer printing onto the layer of cellulose acetate (CA) treated by the drying and/or annealing treatment. The layer of cellulose acetate (CA) printed with the pattern by transfer printing was dried by drying treatment. This prevented the ink from diffusing and/or penetrating on the surface and deep into the layer and enables the pattern having a better clarity.

Another piece of transparent cellulose acetate (CA) with a thickness of 0.5 mm was placed on a surface printed with a pattern by transfer printing. The transparent cellulose acetate was instantly welded with a patterned layer of cellulose acetate (CA) by a high frequency welding machine, wherein the welding time was 20 seconds, and the current was 0.8 A. The thermoplastic laminate with the pattern was obtained. Furthermore, the thermoplastic layer and the patterned layer printed by transfer printing were stacked according to the desired thickness of the thermoplastic laminate. The layers were then instantly welded by using the high frequency welding machine. Similarly, other layers of cellulose acetate (CA) were stacked on the different surfaces of a patterned surface according to a design. A multilayered laminate of cellulose acetate (CA) and patterned layer of cellulose acetate (CA) were then instantly welded by the high frequency welding machine.

2B. Preparing the Laminate, Wherein the Drying Step was Not Included

The laminate was prepared by using the same method as 2A. It simply omitted one or more drying steps. Table 2 shows a comparison of effects between the laminate obtained by methods 2A and 2B.

TABLE 2

The comparison between the laminates obtained by drying treatment and without drying treatment

| Example | Transfer paper printed with pattern | Layer printed with pattern by transfer printing | Effect on pattern after transfer printing | Effect on pattern after bonding |
|---|---|---|---|---|
| 2A | With drying treatment | With drying treatment | Very clear | Very clear |
| 2B | With drying treatment | Without drying treatment | Clear | Relatively clear |
| | Without drying treatment | With drying treatment | Clear | Relatively clear |
| | | Without drying treatment | Relatively clear | Relatively blurred |

Figure 14:
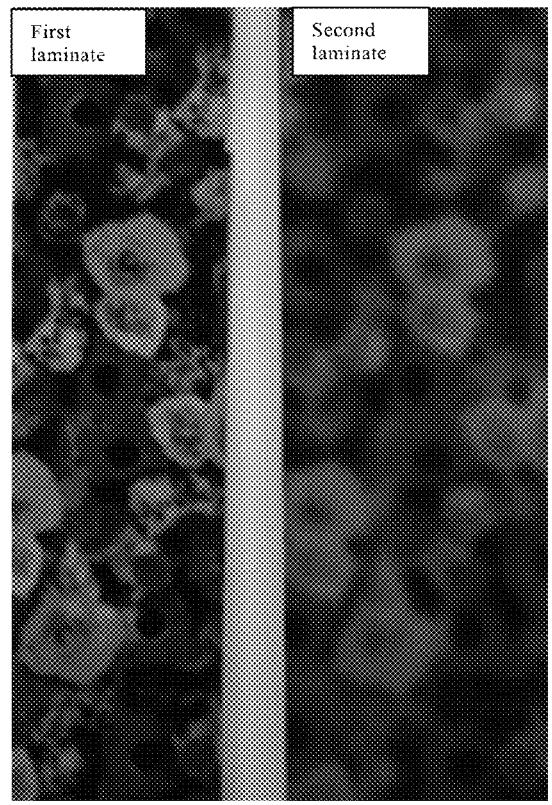
FIG. 14 depicts a comparison of clarity of patterns of the first thermoplastic laminate prepared with drying step and the second thermoplastic laminate prepared without drying step.

FIG. 14 shows a comparison of the effects on pattern between the first thermoplastic laminate prepared by Example 2A and the second thermoplastic laminate (both the transfer printing paper and the layer were undried) prepared by Example 2B. It is obvious that the pattern of the first laminate was much clearer than the second laminate.

It can be seen from Tables 1 and 2 and FIG. 14 that using the transfer printing process with a sublimation ink for printing pattern and drying products by drying treatment from every step of transfer printing process could avoid penetration or diffusion of ink. Each thermoplastic layer was instantly welded by using a high frequency welding machine after transfer printing the pattern onto the thermoplastic layer. The obtained pattern of the thermoplastic laminate was clear, colorful and having the pattern at the edge of the laminate. The bonding strength was also very good.

3. Preparing an Eyewear Temple with Patterns on Three Surfaces

A piece of laminate of cellulose acetate with a thickness of 5.0 mm was provided. The laminate was cut into the shape of the eyewear temple by a cutting machine. A mold for preparing eyewear temple was prepared. The thermoplastic laminate prepared by example 1 was placed into the mold with the shape of the eyewear temple. A coating layer was prepared. Adhesive was evenly coated on the coating layer. The preferred model is JP-202 in which the main ingredients were triethyl citrate and cyclohexanone. The laminate with the shape of the eyewear temple was overlaid by the patterned coating layer and placed into the mold for heat pressing. The eyewear temple with clear patterns on three surfaces was obtained.

The preferred embodiments and examples described above have been used to specifically describe the present invention but are not limited to these embodiments and examples. A person skilled in the art understands that variations and modifications can be made to the above-described embodiments and examples without departing from the spirit and scope of the present invention. All these modifications and variations are intended to be included herein within the scope of the present invention.

The invention claimed is:

1. A method for preparing a thermoplastic laminate for an eyewear, wherein the thermoplastic laminate comprises an upper layer, a lower layer, and one or more core layers and optional one or more inner layers located between the upper layer and lower layer, and wherein the method comprises the steps of:

1) providing the thermoplastic upper layer and lower layer;

2) providing one or more core layers, which are selected from a pattern, an article and combinations thereof, located between the upper layer and lower layer;
3) optionally providing one or more thermoplastic inner layers between the upper layer and an adjacent core layer, the lower layer and an adjacent core layer, and/or two adjacent core layers;
4) bonding one or more core layers, the upper layer, the lower layer and the optional inner layers together by using a high frequency welding machine; and
5) obtaining the laminate, wherein the welding time of the high frequency welding machine is greater than about 15 seconds, wherein the electric current of the high frequency welding machine is greater than about 0.5 A but less than about 5 A, and wherein the cooling time of the high frequency welding machine used after bonding is greater than about 0.5 minutes.

2. The method of claim 1, wherein at least one of the core layers is a pattern, and wherein the pattern is fixed by a transfer printing process on a surface of the upper layer, the lower layer and/or an optional inner layer where the surface is bonded with an adjacent layer.

3. The method of claim 2, wherein the transfer printing process comprises the steps of:
A) printing the pattern onto a transfer medium, wherein the transfer medium is a paper;
B) optionally, drying the transfer medium printed with pattern to remove solvents and/or water, wherein the drying temperature is from about 40° C. to about 70° C., or from about 50° C. to about 65° C.; and
C) transferring the pattern from the transfer medium onto a surface of a targeted layer, wherein the transfer printing temperature is from about 100° C. to about 250° C.

4. The method of claim 3, wherein a sublimation ink containing a sublimation dye is used in the printing step A).

5. The method of claim 3, wherein the relative humidity of air in step A) is maintained from about 45% to about 80%; and wherein the transfer printing time in step C) is from about 30 seconds to about 200 seconds.

6. The method of claim 2, wherein the thermoplastic layer with the pattern fixed by the transfer printing process is dried by drying treatment before step 4).

7. The method of claim 1, wherein at least one of the one or more core layers is an article, wherein the article is fixed on a surface of the upper layer, the lower layer, and/or optional inner layer, where the surface is bonded with an adjacent layer, and optionally at least a position on the surface where the article is located has a cavity having the same size and shape of the article.

8. The method of claim 7, wherein at least one of the one or more core layers is a pattern, and wherein the pattern and article are in the same surface or different surfaces of a layer, or on an adjacent surface or non-adjacent surfaces of different layers.

9. The method of claim 1, wherein the welding time of the high frequency welding machine in step 4) is greater than about 20 seconds and less than about 5 minutes, or less than about 1 minute, or from about 30 seconds to about 50 seconds; wherein the electric current of the high frequency welding machine in step 4) is less than about 2 A, or from about 0.6 A to about 1.3 A; and wherein the cooling time of the high frequency welding machine used in step 4) after bonding is greater than about 1 minutes but less than about 5 minutes, or less than about 3 minutes, or about 2 minutes.

10. The method of claim 1, wherein the thermoplastic layers prior to use are subjected to drying and/or annealing treatment.

11. A thermoplastic laminate prepared by the method of claim 1.

12. A part of an eyewear prepared from the thermoplastic laminate of claim 11, wherein the part is a front frame of the eyewear, a temple of the eyewear or an endtip of the eyewear.

* * * * *